(12) United States Patent
Taylor

(10) Patent No.: US 8,296,565 B2
(45) Date of Patent: Oct. 23, 2012

(54) COMMUNICATION PROTOCOL FOR DEVICE AUTHENTICATION

(75) Inventor: John P. Taylor, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 1062 days.

(21) Appl. No.: 11/682,840

(22) Filed: Mar. 6, 2007

(65) Prior Publication Data

US 2007/0226497 A1      Sep. 27, 2007

Related U.S. Application Data

(60) Provisional application No. 60/786,164, filed on Mar. 27, 2006.

(51) Int. Cl.
*G06F 21/00*     (2006.01)
(52) U.S. Cl. ......... 713/169; 713/168; 713/170; 380/247
(58) Field of Classification Search .................. 713/168, 713/169, 170; 380/247
See application file for complete search history.

(56) References Cited

U.S. PATENT DOCUMENTS

| | | | | |
|---|---|---|---|---|
| 4,471,486 A | * | 9/1984 | Sibley | 714/49 |
| 4,744,084 A | * | 5/1988 | Beck et al. | 714/33 |
| 4,750,135 A | * | 6/1988 | Boilen | 709/231 |
| 4,825,050 A | * | 4/1989 | Griffith et al. | 235/379 |
| 5,471,631 A | * | 11/1995 | Beardsley et al. | 713/502 |
| 5,608,306 A | * | 3/1997 | Rybeck et al. | 320/106 |
| 5,737,247 A | * | 4/1998 | Baer et al. | 702/149 |
| 6,075,195 A | * | 6/2000 | Gabai et al. | 84/645 |
| 6,578,152 B1 | * | 6/2003 | Burnside | 713/300 |
| 6,636,689 B1 | * | 10/2003 | Stebbings | 386/94 |
| 6,757,845 B2 | * | 6/2004 | Bruce | 714/32 |
| 6,778,006 B2 | * | 8/2004 | Lin | 327/540 |
| 6,826,128 B1 | * | 11/2004 | Berstis et al. | 368/121 |
| 6,925,025 B2 | * | 8/2005 | Deng et al. | 365/226 |
| 7,073,037 B2 | * | 7/2006 | Okuyama et al. | 711/164 |
| 7,307,907 B2 | * | 12/2007 | Houston | 365/222 |
| 7,596,699 B2 | * | 9/2009 | Kwok | 713/176 |

(Continued)

FOREIGN PATENT DOCUMENTS

JP      2005-341775 A      12/2005

OTHER PUBLICATIONS

Internet Document: "Dallas/Maxim Product Data Sheet: DS2703 SHA-1 Battery Pack Authentication IC" at http://datasheets.maxim-ic.com/en/ds/DS2703.pdf (accessed Mar. 2, 2007).

(Continued)

*Primary Examiner* — Edan Orgad
*Assistant Examiner* — Bradley Holder

(57) ABSTRACT

A communication protocol between a master device, such as a mobile phone, and a peripheral device facilitates authentication of the peripheral device. When a peripheral device is detected, the master device initiates a wake-up command to the peripheral device, transmits an authentication request command followed by challenge data to the peripheral device, and awaits responses from the peripheral device. The accessory receives the challenge data, performs a hash function on the challenge data, and generates response data. An authentication response type byte is sent to the handset followed by the response data. The handset compares the response data to pre-stored data that is associated with the challenge data. A match indicates that the accessory is authentic. The challenge/response data, also referred to as a plaintext/cyphertext pair, is pre-generated external to the handset using the hash function, then pre-stored in the handset.

16 Claims, 9 Drawing Sheets

U.S. PATENT DOCUMENTS

| | | | |
|---|---|---|---|
| 7,617,395 B2 * | 11/2009 | Sasaki et al. | 713/168 |
| 7,971,058 B2 | 6/2011 | Taylor | |
| 2002/0188466 A1 * | 12/2002 | Barrette et al. | 705/2 |
| 2003/0179605 A1 * | 9/2003 | Riesenman et al. | 365/189.01 |
| 2003/0210055 A1 * | 11/2003 | Porter et al. | 324/415 |
| 2004/0128551 A1 * | 7/2004 | Walker et al. | 713/201 |
| 2004/0210637 A1 * | 10/2004 | Loveland | 709/204 |
| 2005/0010782 A1 | 1/2005 | Ohjubo et al. | |
| 2005/0127868 A1 | 6/2005 | Calhoon et al. | |
| 2005/0188200 A1 * | 8/2005 | Kwok | 713/168 |
| 2005/0188206 A1 | 8/2005 | Kwok | |
| 2006/0043937 A1 * | 3/2006 | Patino et al. | 320/150 |
| 2006/0108972 A1 * | 5/2006 | Araya | 320/106 |
| 2006/0117176 A1 | 6/2006 | Sasaki et al. | |
| 2006/0122730 A1 * | 6/2006 | Niemela et al. | 700/245 |
| 2006/0178170 A1 * | 8/2006 | Chung et al. | 455/572 |
| 2006/0204004 A1 * | 9/2006 | Shankar et al. | 380/44 |
| 2007/0024235 A1 * | 2/2007 | Guthrie | 320/106 |
| 2009/0064209 A1 * | 3/2009 | Lo et al. | 720/601 |
| 2009/0239502 A1 * | 9/2009 | Dempo et al. | 455/411 |
| 2010/0268946 A1 | 10/2010 | Taylor | |

OTHER PUBLICATIONS

Connor, Margery, "Friend or Foe: Battery-authentication ICs separate the good guys from the bad," EDN, Feb. 2, 2006, p. 59-62.

* cited by examiner

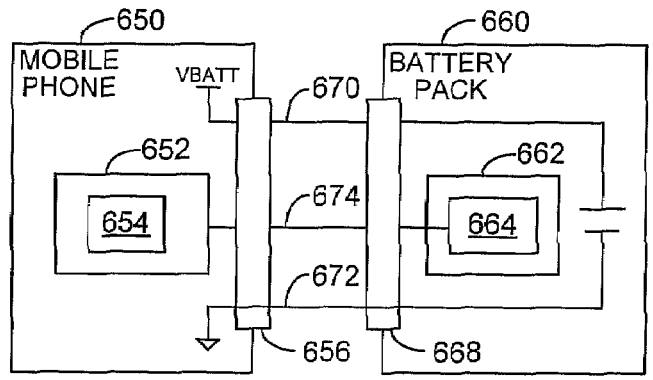
FIG. 6
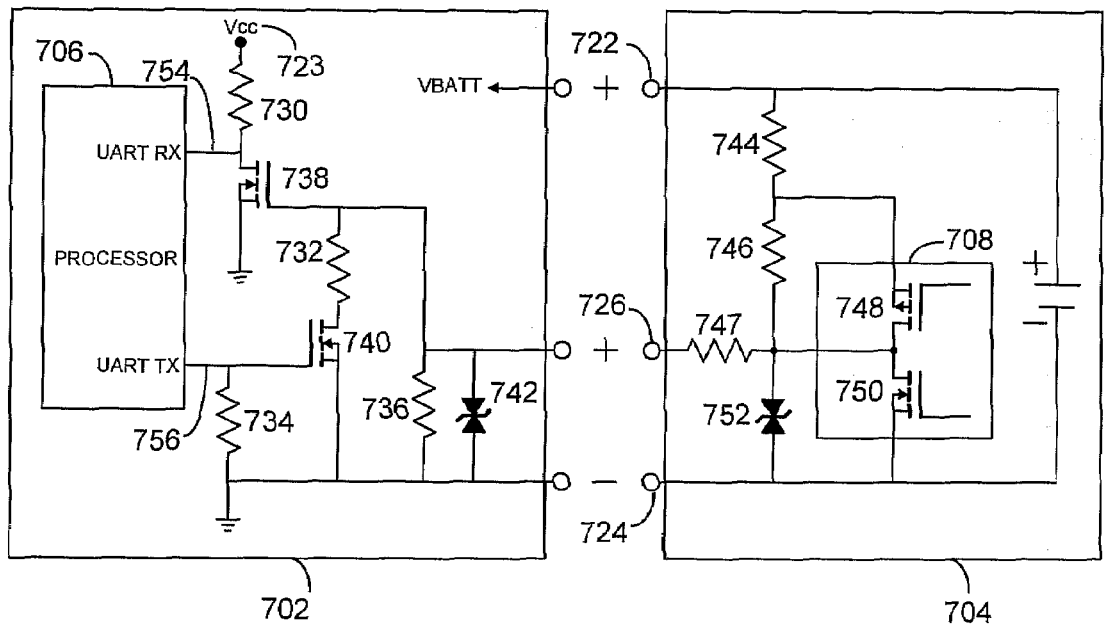
Fig. 7b
| ACHIP OUT | UART TX | ID | UART RX |
|---|---|---|---|
| HI-Z | L | H | L |
| HI-Z | H | L | H |
| L | X | L | H |
| H | X | H | L |
Fig. 7a

| BYTES SENT BY HANDSET | BYTES SENT BY PACK | BYTES ON ID PIN |
|---|---|---|
| 0xff | | 0xff (WAKE UP) |
| 0x00 | | 0x00 (TIMING COMMAND) |
| | 0x80 | 0x80 (TIMING RESPONSE) |
| | 0xC3 | 0xC3 (TIMING BYTE) |

| BYTES SENT BY HANDSET | BYTES SENT BY PACK | BYTES ON ID PIN |
|---|---|---|
| 0xff | | 0xff (WAKE UP) |
| 0x01 | | 0x01 (TEMP COMMAND) |
| | 0x81 | 0x81 (TEMP RESPONSE) |
| | 0xXX | 0xXX (TEMP DATA) |

| BYTES SENT BY HANDSET | BYTES SENT BY PACK | BYTES ON ID PIN |
|---|---|---|
| 0xff | | 0xff (WAKE UP) |
| 0x02 | | 0x02 (ID/ VERSION COMMAND) |
| | 0x82 | 0x82 (ID/ VERSION RESPONSE) |
| | 0xXX | 0xXX (VERSION DATA) |

Fig. 12

| BYTES SENT BY HANDSET | BYTES SENT BY PACK | BYTES ON ID PIN |
|---|---|---|
| 0xff | | 0xff (WAKE UP) |
| 0x04 | | 0x04 (CHIP ID COMMAND) |
| | 0x84 | 0x84 (CHIP ID RESPONSE) |
| | 0xXX | 0xXX (CHIP ID DATA MSB) |
| | 0xXX | 0xXX (CHIP ID DATA) |
| | 0xXX | 0xXX (CHIP ID DATA) |
| | 0xXX | 0xXX (CHIP ID DATA LSB) |

Fig. 13

|  | BYTES SENT BY HANDSET | BYTES SENT BY PACK | BYTES ON ID PIN |
|---|---|---|---|
| 1401 | 0xff | | 0xff (WAKE UP) |
| 1402 | 0x08 | | 0x04 (AUTHENTICATE COMMAND) |
| 1404 | 0xXX | | 0xXX (CHALLENGE DATA MSB) |
| 1406 | 0xXX | | 0xXX (CHALLENGE DATA) |
| | 0xXX | | 0xXX (CHALLENGE DATA) |
| | 0xXX | | 0xXX (CHALLENGE DATA) |
| | 0xXX | | 0xXX (CHALLENGE DATA) |
| | 0xXX | | 0xXX (CHALLENGE DATA) |
| | 0xXX | | 0xXX (CHALLENGE DATA) |
| 1408 | 0xXX | | 0xXX (CHALLENGE DATA LSB) |
| 1410 | | 0x88 | 0x88 (AUTHENTICATE RESPONSE) |
| 1412 | | 0xXX | 0xXX (RESPONSE DATA MSB) |
| 1414 | | 0xXX | 0xXX (RESPONSE DATA) |
| | | 0xXX | 0xXX (RESPONSE DATA) |
| | | 0xXX | 0xXX (RESPONSE DATA) |
| | | 0xXX | 0xXX (RESPONSE DATA) |
| | | 0xXX | 0xXX (RESPONSE DATA) |
| | | 0xXX | 0xXX (RESPONSE DATA) |
| 1416 | | 0xXX | 0xXX (RESPONSE DATA LSB) |

Fig. 14

COMMUNICATION PROTOCOL FOR DEVICE AUTHENTICATION

RELATED APPLICATIONS

This application claims the benefit of U.S. Provisional Application 60/786,164 (the '164 application), filed Mar. 27, 2006, which is hereby incorporated by reference. This application is also related to co-pending U.S. patent application Ser. No. 11/682,831 (the '831 application) and co-pending U.S. patent application Ser. No. 11/682,834 (the '834 application), both of which were filed on Mar. 6, 2007. The '831 application and the '834 application both claim priority from the '164 application.

TECHNICAL FIELD

The present invention relates to the field of wireless communication devices. More specifically, the invention relates to authenticating peripheral devices attachable to the wireless communication devices.

BACKGROUND

Various peripheral devices, generally referred herein to as "accessories," may be attached and detached from mobile phones, also referred to herein as "handsets", and other wireless communication devices. These accessories, when attached, provide additional functionality and/or otherwise enhance the performance of the mobile phones. In other cases, accessories facilitate the user's ability to productively or comfortably use the mobile phones. A phone battery, though normally thought of as integral with a phone, is also considered an "accessory" for purposes of the present disclosure.

During the design and development of wireless communication devices, it is common to test the compatibility and/or reliability of accessories anticipated for use with the wireless communication device. Such testing ensures that an accessory will operate with a reasonable level of compatibility with the wireless communication device. Unfortunately, accessories made available by third parties for use with wireless communication devices are often not tested or, even if tested, fall below the standards defined by manufacturers of wireless communication devices and/or other standards, e.g., defined by government bodies. Such accessories (referred to herein as "unauthorized accessories") have the capability of damaging the wireless communication device and/or pose a safety threat to a consumer.

Existing techniques for preventing unauthorized accessories to be employed with wireless communication devices have been relatively easy to circumvent. For example, connectors employing unique mechanical keying arrangements can be overcome with mechanical modifications to the connectors. Electrical arrangements employing resistors for authentication are likewise easily circumvented with appropriate circuitry. Finally, digital communication techniques employing fixed passwords or rolling codes are relatively easy to defeat or mimic.

Accordingly, there remains a strong need in the art for an effective and secure authentication method and apparatus for wireless communication devices.

SUMMARY

An exemplary method of managing communications between a master device and an peripheral (accessory) device is disclosed. The peripheral device is connected to the master device by a connection port. The connection port includes include a communication terminal with one or more communications lines. The master device monitors the communication terminal for connection of the peripheral device. If the peripheral device is detected, the master device initiates a wake-up command to the peripheral device, transmits an information request command to the peripheral device and awaits a response(s) from the peripheral device. An authentic peripheral device will return a response-type byte to indicate the type of response, followed by one or more bytes of the data requested in the information request command.

In one embodiment, the information request command is an authentication request command followed by challenge data. The peripheral device receives the challenge data, performs a hash function on the challenge data, and sends the master device an authentication response-type byte followed by response data. The hash function in one embodiment is an execution of a secure authentication application embodied in a secure authentication image file stored within the peripheral device. The master device, e.g., a wireless handset, receives the authentication response-type byte from the accessory followed by the response data. The handset compares the response data to pre-stored data that is associated with the challenge data. A match indicates that the accessory is authentic. The challenge data/response data, also referred to as plaintext/cyphertext pairs, is pre-generated external to the handset and then stored in the handset to ensure that a hash/encryption key has limited availability.

In an exemplary embodiment, the plaintext/cyphertext pairs are generated by supplying identical plaintext strings to two separate processors having an identical secure image file. The two processors execute the secure authentication application on the plaintext strings, and output cyphertext strings. If the cyphertext strings from the two separate processors match, then the plaintext/cyphertext pair is stored in a database. This process is repeated for any number of unique plaintext strings. Each generated unique plaintext/cyphertext pair will be used in master devices, such as a mobile phones, to verify that attached accessories are authentic as discussed above.

The secure image file utilized in the authentication of accessories is generated by supplying a secure key and a raw image file to a key merger application. The resulting merged file is the secure authentication image file. The secure key is safeguarded, by for example storing a single copy of the secure key and erasing the raw image file and secure key from the generating device. The secure authentication image file is then copied as needed for use in generating the plaintext/cyphertext pairs, and for including in manufactured accessories. However, since the secure key and raw image file are no longer available, the secure authentication image file utilized to authenticate devices will be difficult to counterfeit.

BRIEF DESCRIPTION OF THE DRAWINGS

The described embodiments are to be considered in all respects as illustrative and not restrictive. It should also be understood that the invention is not limited to the particular embodiments illustrated and described herein, but is capable of many rearrangements, modifications, and substitutions without departing from the scope of the invention. As such, the details of the present invention, both as to its structure and operation, may be gleaned in part by study of the accompanying drawings described below, in which like reference numerals refer to like parts.

FIG. 6 illustrates a mobile device and a battery pack accessory in a master-slave configuration according to one embodiment of the invention.

FIG. 7*a* illustrates an exemplary circuit for interfacing a handset and an accessory according to one embodiment of the invention.

FIG. 7*b* is an exemplary truth table defining the configuration of the communication terminal of FIG. 7 according to one embodiment of the invention.

FIG. 12 is an exemplary table which defines message commands for exchanging ID/Version information according to one embodiment of the invention.

FIG. 13 is an exemplary table which defines message commands for exchanging chip identification information according to one embodiment of the invention.

FIG. 14 is an exemplary table which defines message commands for exchanging authentication information according to one embodiment of the invention.

DETAILED DESCRIPTION

Figure 1:
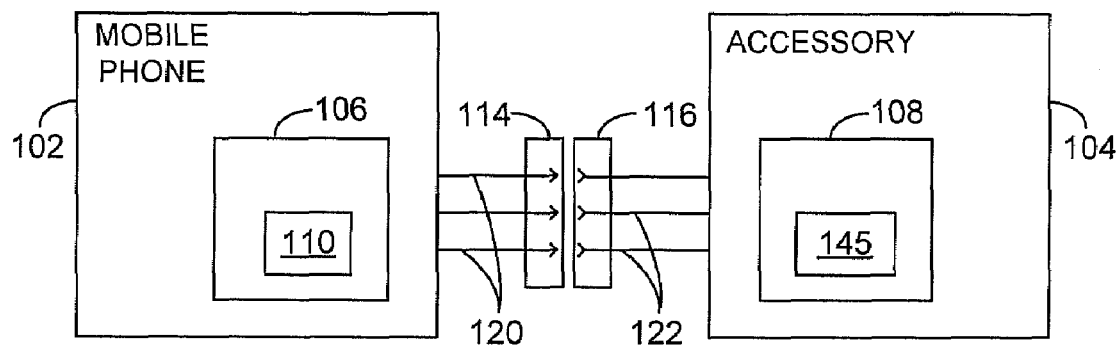
FIG. 1 illustrates an exemplary arrangement including a mobile phone and a mobile phone accessory according to one embodiment of the invention.

Referring first to FIG. 1, there is shown mobile phone 102 and mobile phone accessory 104 capable of being connected to mobile phone 102 according to one embodiment of the invention. Mobile phone 102 may be any wireless communication device capable of transmitting and receiving electromagnetic ("EM") energy in the radio frequency ("RF") band via an antenna coupled to the transceiver (not shown). Although the exemplary authentication method described herein is carried out by a mobile phone device for authenticating a mobile phone accessory, the method can also be used to authenticate battery packs or accessories for video cameras, notebook computers, MP3 players, and other electronic devices.

Mobile phone 102 typically includes a processor 106 for carrying out a number of functions related to operating mobile phone 102. The processor is coupled to a transceiver for communicating RF signals via the antenna (not shown). A power supply, such as a battery, supplies power to the processor, memory, transceiver, and other mobile phone 102 components. Mobile phone 102 further includes a number of input/output ("I/O") devices (not shown) for receiving and transmitting information to the user.

Continuing with FIG. 1, mobile phone 102 further includes one or more accessory interfaces 114 for connecting an accessory, also referred to herein as a peripheral device, to the mobile phone 102. Although the techniques described herein may be used with a wide variety of accessories and accessory interfaces, FIG. 1 illustrates an example arrangement involving a battery accessory 104 having an interface 116 connected to accessory interface 114 of mobile phone 102. As shown in FIG. 1, accessory interface 114 of mobile phone 102 includes a plurality of lines 120, and interface 116 of accessory 104 includes a corresponding plurality of lines 122. By way of illustration, when mobile phone 102 and accessory 104 are connected, a first line of the plurality of lines 122 may used to provide a supply voltage, a second line may be used to provide a reference voltage, e.g., such as ground, and a third line may be used to provide bi-directional communication between mobile phone 102 and accessory 104. The number of lines 120, 122 shown in FIG. 1 are for illustration purposes, only. Other embodiments may have one or any number of lines required for a particular peripheral accessory.

According to another embodiment, communication as described herein may be carried out over supply voltage lines. For example, bi-directional signaling may be employed over the voltage supply line via modulation. As another example, bi-directional signaling may be employed over the voltage supply line by employing switches to enable the line to operate in a first bi-directional signaling mode during the authentication process, and to enable lines the voltage supply line operate in a second voltage supplying mode after accessory 104 is authenticated. A benefit of enabling communication over existing voltage supply lines is that dedicated communication lines are not required, and thus, the interface and connectors between the mobile phone 102 and accessory 104 need not be modified from previous arrangements that do not employ the authentication method described herein.

Continuing with FIG. 1, processor 106 of mobile phone 102 is connected to accessory interface 114, and processor 108 of accessory 104 is connected to interface 116. Processor 106 may be the main processor of mobile phone 102 or may be an auxiliary processor within mobile phone 102. Processor 106 executes an authentication algorithm 110, and processor 108 executes a secure authentication application embodied in a secure authentication image file 145 stored therein. Processor 108 includes security features that prevents reading of any internal code including secure authentication image file 145. The contents and the generation of secure authentication image file 145 will be described in further detail below.

Generating Secured Authentication Image Files

Figure 2:
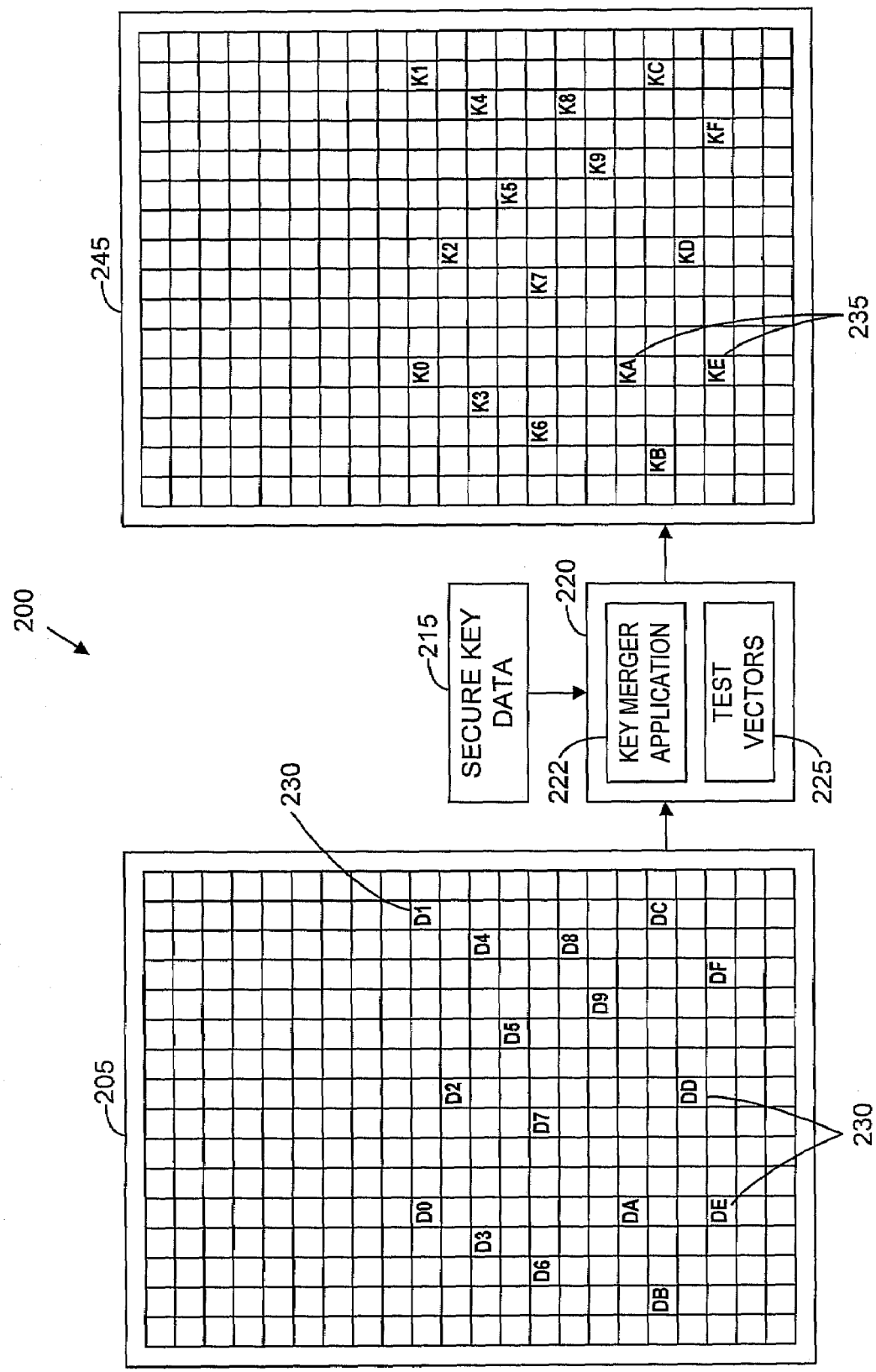
FIG. 2 illustrates an exemplary system for generating secure authentication image files according to one embodiment of the invention.

Referring to FIG. 2, there is shown an exemplary system 200 for generating secure authentication image file 245. Generally, the secure authentication image file 245 corresponds with the secure authentication image file 145 of FIG. 1, and provides the programming executed by the processor 108 for authenticating accessory 104, among other things. An exemplary method for generating secure authentication image file 245 according to one embodiment is depicted in flow chart 300 of FIG. 3.

Figure 3:
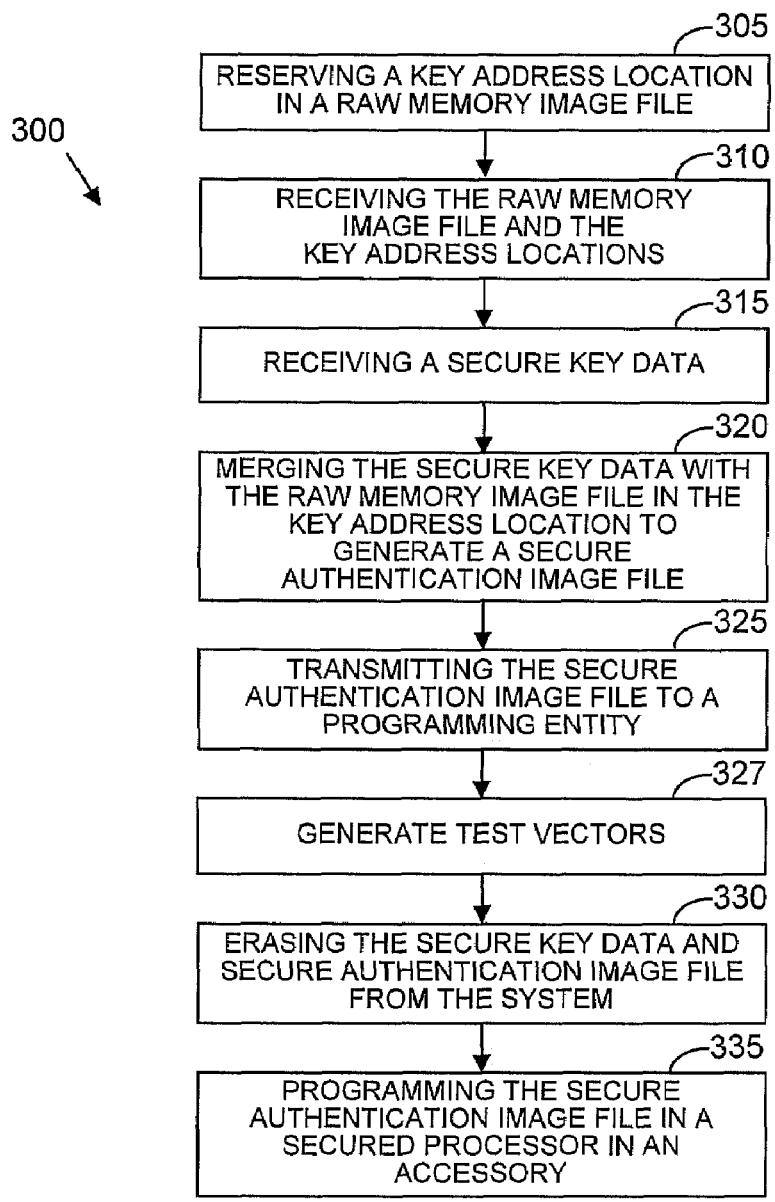
FIG. 3 illustrates a flow chart for generating secure authentication image files according to one embodiment of the invention.

Certain details and features have been left out of flow chart 300 of FIG. 3 that are apparent to a person of ordinary skill in the art. For example, a step may consist of one or more sub-steps or may involve specialized equipment or materials, as known in the art. While steps 305 through 335 shown in flow chart 300 are sufficient to describe one embodiment of the present invention, other embodiments of the invention may utilize steps different from those shown in flow chart 300.

At block 305, a key address location(s) is reserved in a raw memory image file of system 200. For example, in FIG. 2, a plurality of key address locations (identified as D0 through DF) 230 are reserved in a raw memory image file 205. The raw memory image file 205 may include programming for a secured device such as battery accessory 104 of FIG. 1 where the reserved key address locations 230 may contain "dummy" or test data which will be replaced with secure key data during a subsequent secure merging procedure. Address reservation can be performed during the compilation and/or generation of programming instructions. Programming instructions in raw image file 205 may include an authentication program including an encryption algorithm such as a hash function for authenticating accessory 104 as described below.

In the illustrative embodiment shown in FIG. 2, the key address locations 230 are shown distributed across a number of non-contiguous address locations. However, in other embodiments, other arrangements may be employed.

At block 310, a data processing device 220 receives the raw memory image file 205 in a working memory 225 including the identification of the key address locations 230. At block 315, processor 220 receives a secure key data 215 in the working memory 225. For example, the secure key data 215 may be 16 bytes (128 bits) and be a randomly generated value. To prevent public scrutiny of the encryption techniques, and more particularly, the encryption key, the access to the secure key data 215 should be limited.

At block 320, a key merger application 222 executed by data processing device 220 merges the secure key data 215 with the raw image memory file 205 in the key address location 230 to generate a secured authentication image file 245. The size of the reserved key address locations 230 is sufficient to store the secure key data 215. The resulting secure authentication image file 245 contains the secure key data 215 in the secured key address locations 235.

At block 325, secure authentication image file 245 is transmitted to a programming entity which will program secure authentication image file 245 into integrated chips. In one example, the programming entity is a processor integrated circuit (PIC) manufacturer that supplies PICs, for example, processor 108, for use in accessories 104, as shown in FIG. 1. The programming entity can integrate secure authentication image file 245 into the PIC as shown in step 335.

At step 327, a set of test vectors 225 are generated for future use to verify manufactured devices, e.g., the PICs, containing secure authentication image file 145, 245. Test vectors 225 include a limited set of plain text strings and cyphertext strings. The cyphertext strings are generated from an encryption algorithm, utilizing secure authentication image file 245, that is applied to the limited set of plain text strings.

At step 330, secured key data 215 and secure authentication image file 245 are erased/deleted from system 200. As discussed above at step 335, secure authentication image file 245 is programmed into a secured processor, such as processor 108 of FIG. 1. Secured processors, as used in the present application, prevent the reading of its internal code such as the secure authentication image file. For example, in factory programmed PICs, the bits that enable the security features are spread across the memory array and can only be cleared by mass erasing of the memory device. Additional security features that prevent the reading of the internal code may also be employed as additional security measures.

Generation of a Plaintext/Cyphertext Database

Figure 4:
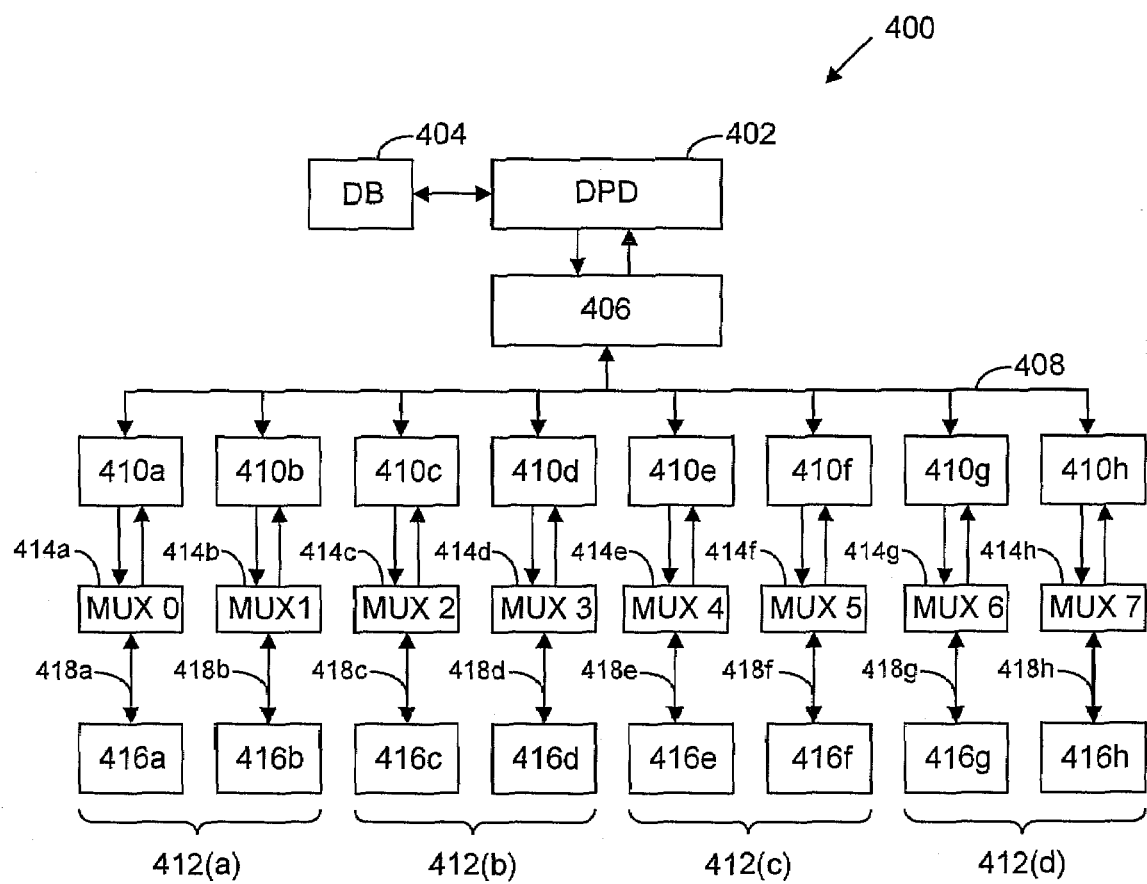
FIG. 4 illustrates an exemplary system for generating a database of plaintext/cyphertext key pairs according to one embodiment of the invention.

Referring now to FIG. 4, there is shown system 400 for generating database 404 of plaintext/cyphertext key pairs, also referred to as vectors, according to one embodiment of the invention. The plaintext/cyphertext pairs are generated for use in each manufactured device such as the mobile phone 102 shown in FIG. 1. Thus a suitable system, such as the system described herein, must be employed to generate the required volume of plaintext/cyphertext pairs. The operation of system 400 according to one embodiment will be discussed with reference to flow chart 500 of FIG. 5. Certain details and features have been left out of flow chart 500 of FIG. 5 that are apparent to a person of ordinary skill in the art. For example, a step may consist of one or more sub-steps or may involve specialized equipment or materials, as known in the art. While steps 502 through 526 shown in flow chart 500 are sufficient to describe one embodiment of the present invention, other embodiments of the invention may utilize steps different from those shown in flow chart 500.

System 400 includes data processing device (DPD) 402 connected to a plurality of slave processors 416a-h. Each slave processor 416a-h stores and executes a secure authentication image file, as discussed above. The secure key data is included as part of the secure authentication image file. It is noted, each slave processor 416a-h mimics the operation of the accessory device to be authenticated in use in that each slave processor 416a-h receives a plaintext challenge and responds with a cyphertext response.

In the particular embodiment shown in FIG. 4, master processor 406 is connected to a high speed interface 408 to eight primary slave processors 410a-h. The master processor 406 is also connected to data processing device 402 in order to communicate the vectors to data processing device 402 for storage in the database 404. Each of primary slave processors 410a-h is connected to a corresponding secondary slave processor 416a-h which communicate through a secondary slave interface 418a-h. Interface 408 operates at least eight times the speed of the primary to secondary slave interface 418a-h in this particular arrangement to provide efficiency in parallel processing as discussed further below.

Figure 5:
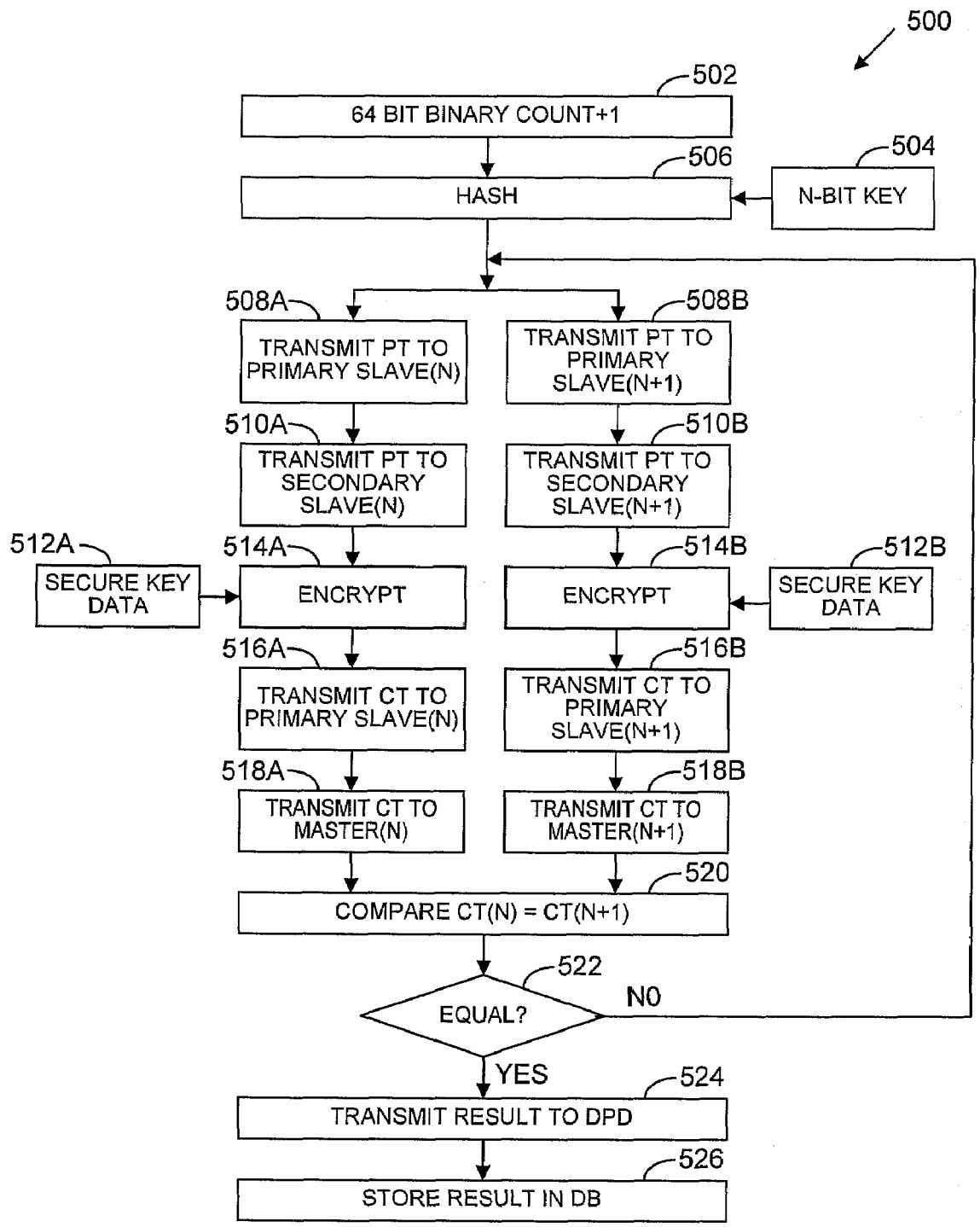
FIG. 5 illustrates a flow chart for generating a database of plaintext/cyphertext key pairs according to one embodiment of the invention.

Master processor 406 uses a counter, depicted as counter function 502 of FIG. 5, that can be set to a specific value before being commanded to start the database generation. This configuration allows multiple master processors to work on ranges of vectors, thereby allowing multiple units to work toward a contiguous database at a speed set by their numbers. In one embodiment the counter function 502 utilizes a 64 bit binary count.

At block 506, master processor 406 executes a hash function with a key, such as a 128 bit key supplied at block 504, and a counter value for generating a plaintext (PT) string. At blocks 508a,b of FIG. 5, this plaintext string, also referred to as a challenge, is communicated to a primary slave processor, for example 410a. At blocks 510a,b, this primary slave processor then communicates the plaintext string to a secondary slave processor, for example 416a, via multiplexor (MUX) 414a-h. At block 514a and 514b, the secondary slave processor, for example 416a, encrypts the plaintext into a cyphertext (CT) response using the secure key data provided at blocks 512a and 512b, respectively. At blocks 516a, 516b, 518a and 518b, the cyphertext response is then communicated back to master processor 406 by way of primary processor 410a.

In system arrangement 400, primary slave processors 410a-h and secondary slave processors 416a-h are arranged into four, two-device groups 412a-d. Each group 412a-d comprises a cyphertext vector generating device and cyphertext vector verifying device to process a plaintext string. For example, group 412 includes cyphertext generating device (collectively, primary slave processor 410a and secondary slave processor 416a) and cyphertext verifying device (collectively, primary slave processor 410*b* and secondary slave processor 416*b*). Blocks 508*a*-518*a* of FIG. 5 may correspond to the operation of the cyphertext vector-generating device, and blocks 508*b*-518*b* may correspond to the operation of the cyphertext vector verifying device.

At block 520, the cyphertext string generated by the cyphertext vector generating device is compared to the cyphertext string generated by the cyphertext vector verifying device. At decision block 522, a determination is made if the cyphertext responses generated by the cyphertext generating device and cyphertext verifying device of the particular group match. If a match is determined, then in step 524 the plaintext and cyphertext are transmitted to data processing device 402 and stored as a vector in database 404, at step 526, for later distribution to production devices, such as mobile phone 102 as shown in FIG. 1. Step 502 is repeated to increment the counter value, as shown in FIG. 5, and the process repeats for a next plaintext string. A benefit of using a consecutive binary count in conjunction with a bidirectional hashing algorithm is that duplicate vectors are avoided.

If the cyphertext responses do not match, at decision block 522, the same plaintext is resent to the group, for example 412*a*, until a matching response is obtained. A mismatch can occur due to device errors such as power glitches and line noise, for example. This verification step is advantages to verify the cyphertext responses since the encryption algorithm and the encryption key are not available externally from the secondary slave processors 416*a-h*. The verification step confirms that the values in the database will not result in an improper rejection of authentic accessory devices in the field.

In system arrangement 400, four groups 412*a-d* are implemented to increase efficiency in generating database 404. However, in other embodiments, any arrangement may be implemented in accordance with such factors as interface bandwidth considerations.

Interface 418*a-h* is a low speed interface in one embodiment, such as 9.6 kbps. This arrangement provides a number of advantages, including reduced power requirements and a sufficiently slow interface that renders reverse engineering the secure authentication image file stored in the secondary slave processor impractical. The slow interface is compensated for using the parallel processing technique described above. Thus, a system and method for securely generating the plaintext/cyphertext pairs has been disclosed.

Bi-Direction Interface for Authenticating Accessories

Bi-directional interfaces that may be used for accessory authentication will be described with reference to FIGS. 6, 7*a* and 7*b*. In the examples that follow, a battery pack accessory for use in a mobile phone is illustrated, although the accessory authentication may also be used with other accessory types for various devices as discussed above.

As shown in an exemplary embodiment of FIG. 6, the peripheral device is a battery back connected to a mobile phone via connectors 656, 668. As discussed above with reference to FIG. 1, one or more signal lines 670, 672, 674 connect mobile phone 650 and battery pack 660. In an exemplary embodiment, the master device, that is, the mobile phone 650, communicates with the peripheral device, that is, the battery pack 660, using a half duplex communication. Half duplex communication typically describes transmission of data one way at a time in a bi-directional communication line(s). The communication between the battery pack and the mobile phone utilizes a two to one data line connection, a one to one data line connection, or any other suitable data or signal line connection, as discussed above with reference to FIG. 1. As illustrated in FIG. 6, connectors 656, 668 also supply a battery voltage, vbatt, and a ground on lines 670 and 672 respectively.

Processor 652 of the mobile phone 650, contains plaintext/cyphertext pairs and a communication algorithm 654. A plaintext challenge, as discussed in detail below, is sent over signal line 674 from processor 652 to processor 662 of the battery pack 600. Processor 662 performs a hash algorithm on the plaintext challenge utilizing the secure authentication file 664, and returns a response cyphertext string. If the response cyphertext string matches the cyphertext string pre-stored in the mobile phone, then the battery pack is an authentic battery pack 660.

Referring to FIG. 7*a*, a first embodiment of battery pack 704 is shown connected to an embodiment of a handset 702. This illustrated embodiment utilizes a UART for a two signal line to one signal line half duplex communication between the handset 702 and the battery pack 704. However, as discussed above, there are many combinations of signal line communications that may be used to realize the accessory authentication discussed herein.

Continuing with FIG. 7*a*, handset 702 includes processor 706 with ports UART RX 754 and UART TX 756. Battery pack 704 has three terminals including battery voltage (Vbatt) terminal 722, ground terminal 724, and communication terminal 726. Vbatt 722 and ground terminal 724, in one embodiment, may be positive and negative connections to battery pack 704. Vbatt 722 is connected to a power supply circuit (not shown) that provides a supply voltage (Vcc) to Vcc terminal 723 Communication terminal 726 provides a communication connection to authentication chip 708, also referred to authentication processor 708. Communication terminal 726 also may be referred to as an identification (ID) terminal. Authentication chip 708 can provide such functions as an accurate measurement of battery temperature, information about battery pack 704 representing pack capacity, serial number, and the authentication function, for example. In one embodiment, communication may be carried out at 9600 baud over the communication terminal 726 in a half-duplex, 8 data bit, 1 start-bit, 1 stop-bit, no-parity format.

Authentication chip 708 contains a secure authentication image file including an algorithm for encrypting (hashing or scrambling) data. Each handset 702 contains a set of unique challenge-response pairs (vectors or plaintext/cyphertext pairs) programmed during provisioning. To authenticate battery pack 704, handset 702 transmits a plaintext challenge over communication terminal 726 to battery pack 704. Authentication chip 708 executes the algorithm utilizing the plaintext challenge, hashes it, and returns a cyphertext response to handset 702. Handset 702 compares the cyphertext response to the corresponding cyphertext component of the challenge-response pair. If a match is determined, battery pack 704 is authenticated. If a match is not determined, battery pack 704 is considered counterfeit. Handset 702 may restrict use or operation of battery pack 704.

It is possible that vibration, electromagnetic interactions, power transients, etc., could corrupt the communication between handset 702 and battery pack 704. Therefore, handset 702 can be configured to make several attempts to authenticate battery pack 704 if the initial attempt fails. Vibration, contaminated electrical contacts, and high-level electrical noise and other spurious signals may cause unintended transitions to occur on communication terminal 726. These transitions will cause authentication chip 708 to wake up and possibly send a response to noise that it has interpreted as a command. Handset 702 may be programmed to accommodate and ignore these transmissions.

In the exemplary embodiment of FIG. 7, communication with authentication chip 708 in battery pack 704 takes place over a single bi-directional communication signal line connected to communication terminal 726 of battery pack 704. A standard 8-bit, no parity, single start-bit, single stop-bit serial data stream conveys all information. Handset 702 initiates all communication. Authentication chip 708 in battery pack 704 will only respond to properly formatted requests from handset 702. Battery pack 704 does not have the capability to enable or disable itself. As discussed above, handset 702 interrogates battery pack 704 to determine whether battery pack 704 is authentic.

The line connected through communication terminal 726 supports a bidirectional serial data link between authentication chip 708 and handset 702. Handset 702 can detect the presence of battery pack 704 by monitoring the open-circuit voltage of communication terminal 726. In one embodiment, pull-up resistor 744 is 300 ohms, pull-up resistor 746 is 33 k ohms, resistor 747 is 330 ohms, resistor 736 is 1M ohms, and resistor 730 is 47 k ohms. Resistor 734 may be 1M ohms and provides current limiting into and out of communication terminal 726. Resistor 732 may be 3.3 k ohms and is a pull-up resistor that maintains the authentication circuit in a "sleep" state when the battery 704 is not connected to the handset 702. These resistor values are only exemplary are selected to control communication via communication terminal 726 as discussed herein.

Communication terminal 726 in battery pack 704 has three possible states: idle/receive, TX high, TX low. When communication terminal 726 is in idle/receive state, i.e., it is not transmitting, transistors 748 and 750 will be off. In the idle mode, communication terminal 726 has a 33.66 k ohm impedance to Vbatt terminal 722. When communication terminal 726 is in the TX high state, transistor 748 is on and transistor 750 is off, resulting in a 660 ohm impedance to Vbatt terminal 722 of battery pack 704. When communication terminal 726 is in the TX low state, transistor 748 is off and transistor 750 is on, resulting in a 330 ohm impedance to ground terminal 724.

Battery pack 704 may be able to control communications on communication terminal 726 under certain circumstances. This capability is enabled by selection of resistors 732, 746 and 747. The truth table depicted in FIG. 7b defines how the configuration of communication terminal 726 (ID 626) is controlled by authentication chip 708 (ACHIP OUT 608).

Referring back to FIG. 7, an example circuit for combining the handset's UART transmit and receive signals into a single signal communicated on communication terminal 726 is shown. Transistors 738 and 740 are N-channel CMOS logic-level switching transistors. Note that the UART receive (UART RX) and UART transmit (UART TX) signals are inverted by this circuit. There are three possible states for the UART TX signal: High, Low, and High-Z. When the UART TX signal is in the low state, or the high-Z state, transistor 740 is turned off. Communication terminal 726 will show a very high, e.g., one million ohm, impedance to ground terminal 724. If battery pack 704 is in the idle/receive (sleep) state, the voltage at communication terminal 726 will be close to the voltage level of Vbatt terminal 722 due to the pull-up resistor 746 in battery pack 704. Transistor 738 subsequently pulls the voltage at UART RX terminal 754 to ground. The circuitry shown in FIG. 7 consumes minimal power in sleep mode with communication terminal 726 pulled up to Vbatt.

When the UART TX signal is high, transistor 740 is on, connecting resistor 732 to ground. This configuration results in communication terminal 726 having an effective impedance of 3.3 k ohms to ground. When connected to battery pack 704, assuming battery pack 704 is in idle/receive state, communication terminal 726 will be pulled down to approximately 0.1 of the voltage level of Vbatt terminal 722 which turns transistor 738 off and pulls up UART RX terminal 754 to a high state by resistor 730. All bits transmitted on UART TX terminal 756 will be received immediately at UART RX terminal 754, if authentication chip 708 is in high-Z or "receive" mode.

The handset software is capable of receiving both the data transmitted by handset 702 and the data transmitted by battery pack 704 on UART RX terminal 754. The UART TX terminal 756 should be in the low state or high-Z state when handset 702 is not transmitting data to battery pack 704. Handset circuit 702 will draw approximately 80 microamperes from Vcc 723 in this mode. When handset 702 is in sleep mode, less than 4 microamperes is drawn from battery pack 704.

Diodes 742 and 752 are electrostatic device (ESD) protection devices. Care should be taken to minimize the amount of capacitance that the ESD devices add to communication terminal 726 circuit. The rise time of the signal transmitted by handset 702 to battery pack 704 is determined by the total pull-up impedance of resistors 744, 746, and 747 (33.66K) and the total capacitance on communication terminal 726. The ESD diode 747 in battery pack 704 has a maximum capacitance of 50 pF, for example. In an exemplary embodiment, the total capacitance on communication terminal 726 is less than 150 pF. Generally, the drain-source resistance of transistor 738, when turned on, is less than or equal to 50 ohms.

Processor 706 transmits binary zeros as a low-voltage output and binary ones as a high-voltage output from the UART TX pin 756. UART RX pin 754 expects this same signal level. The UART TX signal is inverted by transistor 740 to drive communication terminal 726. Inverted signaling is expected at communication terminal 726, i.e., a high level signal ($>0.85*$Vbatt) representing a binary zero and a low-level signal ($<0.15*$Vbatt) representing a binary one. The signal on communication terminal 726 is inverted by transistor 738 before being applied to UART RX pin 754. When the UART in handset 702 is driving UART TX pin 756, the idle state of UART TX pin 756 (when there is no data being sent by the UART) will be a logical one, i.e., a high voltage level. This will turn on transistor 740 and pull battery pack 704 ID pin low through 3.3 k-ohm resistor 732. Battery pack 704 will still be able to drive communication terminal 726 high or low in this state by activating transistors 748 or 750.

When the authentication chip is driving communication terminal 726 to respond to a command, it actively drives the pin high and low using transistors 748 and 750 in FIG. 7. There is a period of approximately 300 microseconds following each stop bit during which transistors 748 and 750 are both off, floating communication terminal 726. To avoid corrupting received data communicated via floating communication terminal 726, handset 702 asserts UART TX during reception by driving a logical one on UART TX pin 756 to turn on transistor 740 and pull down communication terminal 726.

Communication Protocol for Authenticating Accessories

Figures 8, 9, 11:
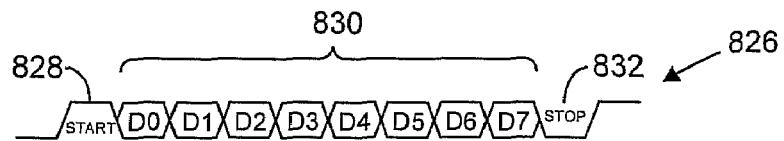
FIG. 8 is an exemplary message format according to one embodiment of the invention.
FIG. 9 is an exemplary table which defines message commands for timing calibration according to one embodiment of the invention.
FIG. 11 is an exemplary table which defines message commands for exchanging temperature information according to one embodiment of the invention.

A communication protocol for authenticating accessories will be described with reference to FIGS. 6 and 8-14. Referring to FIGS. 6 and 8, there is shown an exemplary communication message format 826 communicated over communication terminal/line 674 according to one embodiment. Communication message 826 may be an 8-bit byte including single start bit 828, 8 data bits 830, and single stop bit 832.

In certain embodiments, authentication processor 662 is connected to battery pack 660 at the battery pack manufacturer and is powered at all times throughout the life of battery pack 660. In these cases, authentication processor 662 should use as little power as possible. Authentication processor 662 primarily operates in sleep mode to conserve power. During sleep mode authentication processor 662 is not executing instructions, it is only monitoring communication line 674 for transitions (high-to-low or low-to-high transitions). When a transition occurs on communication terminal 674, authentication processor 662 wakes up and begins operating. However, authentication processor 662 does not begin to process signals on communication line 674 until after the initial transition occurs, such as until 337.5 microseconds (25 microseconds plus three 9600-baud bit periods), for example. If no commands are received over communication terminal 674, authentication processor 662 returns to sleep mode (e.g., 2.3 seconds after waking up). If a command is received within an "awake" window (e.g., 2.3 seconds), authentication processor 662 processes the command and returns to sleep mode after transmitting the response to the command.

The wake-up period can be facilitated a number of ways. One method is to use a timer to determine when the initial transition (e.g., 337.5 microsecond period) has elapsed and then send the command byte(s). Another method is to immediately send the wakeup byte (0xff) during a first portion of the wakeup interval (e.g., 232 microseconds), followed by the command bytes. The wakeup byte will send one "zero" bit (the start bit) followed by nine "one" bits (the eight data bits plus the stop bit). Sending the wakeup byte creates sufficient delay to ensure that the first command byte is sent after the initial transition period (e.g., 337.5 microseconds).

All communication with battery pack 660 is initiated by handset 650 in the embodiment of FIG. 6. Discussed herein are command messages that handset 650 sends to battery pack 660 including a temperature command, an ID/version command, a chip ID command, and an authentication command. Each command begins by waking up battery pack 660 as mentioned above. Each of the commands includes a single command byte with the exception of the authentication command that sends an 8-byte challenge to battery pack 660 after the command byte. If more bytes are sent than expected by battery pack 660, they will either be ignored or will interfere with the response signals from battery pack 660.

In some cases, it may be desirable to calibrate the timing of device communication between handset 650 and battery pack 660. FIG. 9 illustrates Table 900 which identifies exemplary message commands communicated between handset 650 and battery pack 660 for timing calibration. Battery pack 660 responds to a timing command (0x00) 902 by sending a timing response (0x80) 904 followed by a timing byte (0xC3) 906. Handset 650 can measure the length of the string of four logical zeros in this timing byte 906, divide by four, and use the resulting value as the time for a single data bit during transmission or reception. The four logical zeros will be a high level signal in the center of the byte. The two bits on either end of the binary signal 904 are not used for timing purposes.

Figure 10:
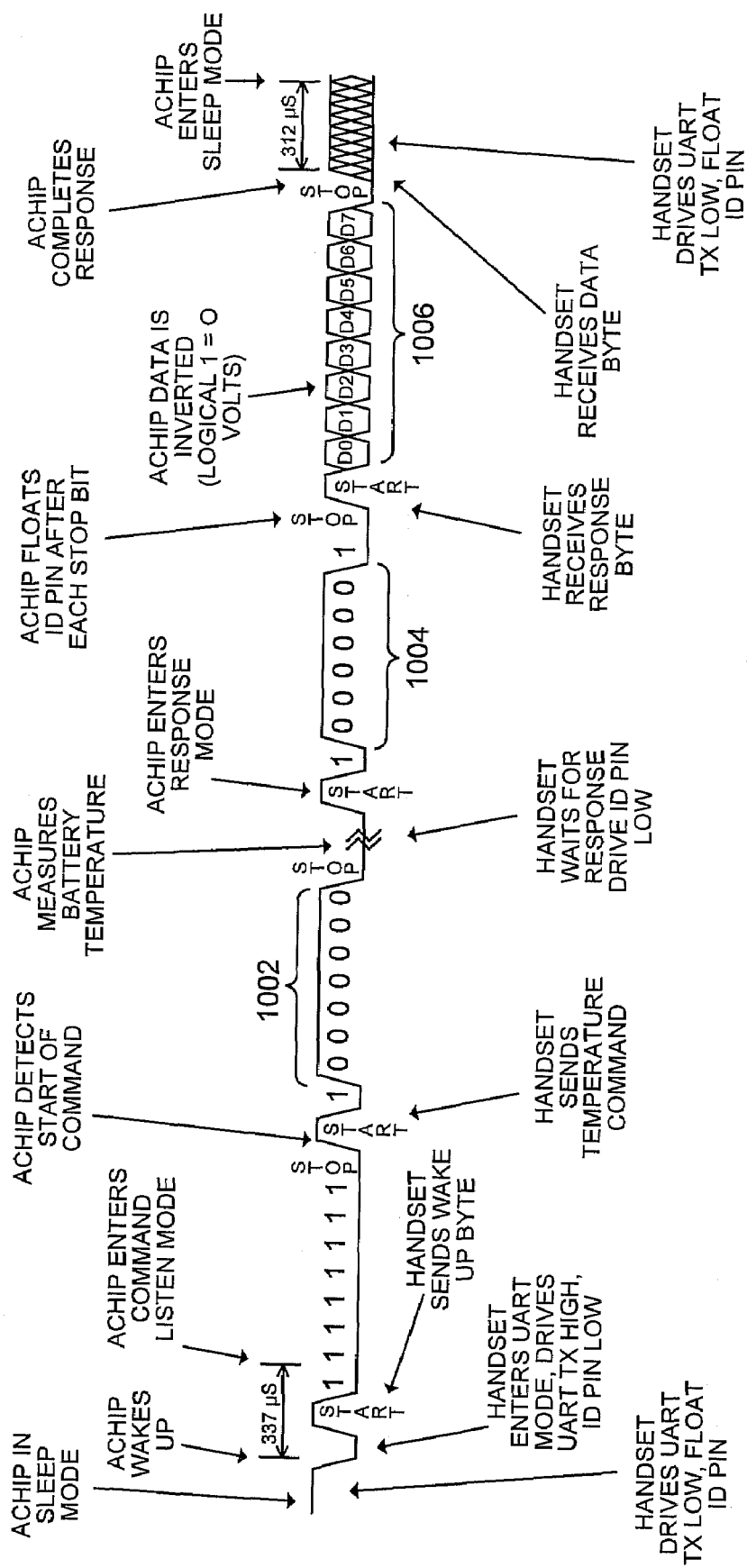
FIG. 10 is an exemplary detailed temperature communication transaction according to one embodiment of the invention.

FIG. 10 depicts a diagram incorporating components of a temperature measurement transaction and FIG. 11 shows Table 1100 which identifies exemplary message commands communicated between handset 650 and battery pack 660 for exchanging temperature information. Handset 650 sends temperature command (0x01) 1002, 1102 to battery pack 660, and battery pack 660 responds by sending a temperature response byte (0x81) 1004, 1104 followed by a byte containing the temperature data 1006, 1106.

FIG. 12 shows Table 1200 which identifies exemplary message commands communicated between handset 650 and battery pack 660 for exchanging ID/Version information associated with battery pack 660. Handset 650 sends ID/Version command (0x02) 1202 to battery pack 660, and battery pack 660 responds by sending a ID/Version response byte (0x82) 1204 followed by a byte containing the ID/Version data 1206 associated with battery pack 660. The ID/Version data may identify such information as battery pack manufacturer, battery pack version, battery pack serial number, battery pack lot, for example.

FIG. 13 shows Table 1300 which identifies exemplary message commands communicated between handset 650 and battery pack 660 for exchanging identification information associated with authentication chip 662. Handset 650 sends chip ID command (0x04) 1302 to battery pack 660, and battery pack 660 responds by sending a chip ID response (0x84) 1304 followed by chip ID information. For example, the chip ID information may comprise four bytes of messages including chip ID data most significant bit (MSB) 1306, chip ID data 1308, chip ID data 1310, and chip ID data least significant bit (LSB) 1312 as illustrated in FIG. 13.

FIG. 14 shows Table 1400 which identifies exemplary message commands communicated between handset 650 and battery pack 660 for exchanging authentication information for authenticating battery pack 660. To initiate a battery authentication, handset 650 sends a wakeup byte (0xff) 1401, followed by an authentication command (0x08) 1402, followed by a "challenge", such as a 64-bit (8-byte) challenge command. As shown in FIG. 14, the challenge command may include challenge data MSB 1404, followed by a challenge data payload 1406, followed by challenge data LSB 1408.

Battery pack 660 performs a hash function on the challenge to generate a "response", such as a 64-bit (8-byte) response. As discussed above, the challenge is typically unique to each handset. The response is transmitted back to handset 650 by sending an authentication response (0x88) 1410 followed by the response command. For example, the response command may include response data MSB 1412, followed by a response data payload 1414, followed by response data LSB 1416.

Handset 650 compares the received response 1412, 1414, 1416 with a stored response associated with the challenge 1404, 1406, 1408. If a match is determined the given challenge, then battery pack 660 is authenticated. If a match is not determined after several attempts to account for possible communication errors, battery pack 660 is considered counterfeit. Handset 650 may restrict use or operation of battery pack 660.

To maintain the secrecy of the operation of the hashing function in authentication chip 662, handset 650 does not contain a copy of the hashing algorithm as discussed above. Instead, at the time of software provisioning of handset 650, a challenge-response pair(s) is stored in the memory of handset 650. The techniques for generating challenge-response pairs is discussed above.

From the above description of exemplary embodiments of the invention, it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. For example, the specific layout arrangement of first radiator arm and second radiator arm of the multi-band antenna could be modified from that discussed above without departing from the scope of the invention. The described exemplary embodiments are to be considered in all respects as illustrative and not restrictive. It should also be understood that the invention is not limited to the particular exemplary embodiments described herein, but is capable of many rearrangements, modifications, and substitutions without departing from the scope of the invention.

What is claimed is:

1. A method for a device to authenticate an accessory having at least one communication port connected to the device, the method comprising:
    monitoring the at least one communication port;
    detecting the accessory attached to the at least one communication port;
    driving the at least one communication port to a first voltage level to maintain the accessory in a sleep mode;
    transitioning the at least one communication port to a second voltage level to initiate a wake up condition in the accessory;
    transmitting a wake up command to the accessory via the at least one communication port;
    transmitting from the device to the accessory an authentication command via the at least one communication port, wherein the authentication command comprises a plaintext challenge to the accessory, wherein the device stores multiple challenge/response vectors before transmitting the plaintext challenge, each of the vectors being different from the other vectors and the different vectors being concurrently stored by the device, and each vector including a plaintext challenge associated with a cyphertext response, and wherein the device selects the plaintext challenge included in the authentication command from among the plaintext challenges included in the stored multiple challenge/response vectors;
    receiving an information request response via the at least one communication port from the accessory, the received information request response comprising a cyphertext response;
    comparing the received cyphertext response with the stored cyphertext response associated with the transmitted plaintext challenge;
    permitting use of the accessory when the received cyphertext response matches the stored cyphertext response associated with the transmitted plaintext challenge; and
    limiting use of the accessory when the received cyphertext response does not match the stored cyphertext response associated with the transmitted plaintext challenge;
    wherein the accessory comprises a secure authentication image file including data in an array of locations, and an accessory processor for receiving the wake up command, generating the cyphertext response using the secure authentication image file, and transmitting the cyphertext response to the device through the at least one communication port.

2. The method of claim 1, further comprising:
    monitoring the at least one communication port for a voltage level transition at the accessory;
    detecting the voltage level transition at the accessory;
    entering a command listen mode at the accessory;
    detecting the wake up command at the accessory;
    receiving the authentication command from the device;
    receiving the plaintext challenge from the device;
    performing a hash function on the received plaintext challenge utilizing a secure authentication image file to generate a cyphertext response, the image file including data for a two-dimensional array of regularly spaced locations;
    sending an authentication response type byte to the device; and
    sending the generated cyphertext response to the device.

3. The method claim 1, further comprising:
    transmitting an information request command via the at least one communication port to the accessory.

4. The method of claim 3, wherein the information request command is a timing command, and wherein the information request response comprises a timing response and a timing byte.

5. The method of claim 3, wherein the information request command is a temperature command, and wherein the information request response comprises a temperature response and temperature data.

6. The method of claim 3, wherein the information request command is an identification command, and wherein the information request response comprises an identification response and identification data.

7. The method of claim 1, wherein the transmitting and the receiving steps between the device and the accessory are half duplex communications.

8. The method of claim 1, wherein the device is a wireless communication device, and the accessory is a battery.

9. A system for authenticating an accessory, comprising:
    a device comprising:
    at least one communication port for connection to the accessory;
    a memory for storing at least one information request command and at least one expected information request response; and
    a processor coupled to the memory and the at least one communication port, the processor monitoring the at least one communication port, detecting the accessory attached to the at least one communication port, driving the at least one communication port to a first voltage level to maintain the accessory in a sleep mode, transitioning the at least one communication port to a second voltage level to initiate a wake up condition in the accessory, transmitting a wake up command to the accessory via the at least one communication port, transmitting from the device to the accessory an authentication command via the at least one communication port to the accessory, receiving an information request response via the at least one communication port from the accessory, comparing the received information request response with the at least one expected information request response, permitting use of the accessory when at least a portion of the received information request response matches the at least one expected information request response, and limiting use of the accessory when the at least a portion of the received information request response does not match the at least one expected information request response,
    wherein the authentication command comprises a plaintext challenge to the accessory,
    wherein the device stores multiple challenge/response vectors before transmitting the plaintext challenge,
    each of the vectors being different from the other vectors and the different vectors being concurrently stored by the device, and
    each vector including a plaintext challenge associated with a cyphertext response, and wherein the device selects the plaintext challenge included in the authentication command from among the plaintext challenges included in the stored challenge/response vectors; and wherein the pre-stored expected information request response is the cyphertext response that the device associates with the selected plaintext challenge; and the accessory for attachment to the device through the at least one communication port, the accessory comprising:

a secure authentication image file, the image file including data for an array of regularly spaced locations; and a accessory processor for detecting a voltage level transition, entering a command listen mode, detecting the first and second voltage levels, receiving the transmitted authentication command, generating an information request response, and transmitting the information request response to the device through the at least one communication port.

10. The system of claim 9, wherein the at least one information request command comprises an authentication command and a plaintext challenge;

wherein at least a portion of the information request response is a cyphertext response;

wherein the accessory processor performs a hash function on the received plaintext challenge utilizing the secure authentication image file to generate the cyphertext response.

11. The system of claim 9, wherein the information request command is a timing command, and wherein the information request response comprises a timing response and a timing byte.

12. The system of claim 9, wherein the information request command is a temperature command, and wherein the information request response comprises a temperature response and temperature data.

13. The system of claim 9, wherein the information request command is an identification command, and wherein the information request response comprises an identification response and identification data.

14. The system of claim 9, wherein the transmitting and the receiving steps between the device and the accessory are half duplex communications.

15. The system of claim 9, wherein the device is a wireless communication device and the accessory is a battery for supplying power to the wireless communication device.

16. A method for a device to authenticate an accessory having at least one communication port connected to the device, the method comprising:

monitoring the at least one communication port;

detecting the accessory attached to the at least one communication port;

driving the at least one communication port to a first voltage level to maintain the accessory in a sleep mode;

transitioning the at least one communication port to a second voltage level to initiate a wake up condition in the accessory;

transmitting a wake up command to the accessory via the at least one communication port;

transmitting to the accessory a plaintext challenge via the at least one communication port, wherein the device stores multiple challenge/response vectors before transmitting the plaintext challenge, each of the multiple challenge/response vectors being different from the other vectors and the different vectors being concurrently stored by the device, and each vector including a plaintext challenge associated with a cyphertext response, and wherein the device selects the plaintext challenge from among the plaintext challenges included in the stored challenge/response vectors;

receiving, in response to the transmitted plaintext challenge a cyphertext response via the at least one communication port from the accessory;

comparing the received cyphertext response with a stored cyphertext response associated with the transmitted plaintext challenge;

permitting use of the accessory when the received cyphertext response matches the stored cyphertext response that the device associated with the transmitted plaintext challenge selected by the device; and limiting use of the accessory when the received cyphertext response does not match the stored cyphertext response;

wherein the accessory comprises a secure authentication image file including data in an array of locations, and an accessory processor for receiving the wake up command, generating the cyphertext response using the secure authentication image file, and transmitting the cyphertext response to the device through the at least one communication port.

* * * * *